US012333331B2

United States Patent
Raghavendran et al.

(10) Patent No.: US 12,333,331 B2
(45) Date of Patent: Jun. 17, 2025

(54) AUTOMATED CONSTRUCTION OF SOFTWARE PIPELINE

(71) Applicant: Cisco Technology, Inc., San Jose, CA (US)

(72) Inventors: Vijayakumar Raghavendran, Fremont, CA (US); Srinjoy Chakraborty, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 548 days.

(21) Appl. No.: 17/176,524

(22) Filed: Feb. 16, 2021

(65) Prior Publication Data
US 2022/0261274 A1 Aug. 18, 2022

(51) Int. Cl.
| | |
|---|---|
| *G06F 9/48* | (2006.01) |
| *G06F 8/60* | (2018.01) |
| *G06F 9/50* | (2006.01) |
| *G06F 11/34* | (2006.01) |
| *G06N 20/00* | (2019.01) |
| *G06F 11/3668* | (2025.01) |

(52) U.S. Cl.
CPC .............. *G06F 9/48* (2013.01); *G06F 8/60* (2013.01); *G06F 9/5005* (2013.01); *G06F 11/3495* (2013.01); *G06N 20/00* (2019.01); *G06F 11/3688* (2013.01); *G06F 2209/5021* (2013.01)

(58) Field of Classification Search
CPC ............... G06F 9/48–5077; G06F 8/60; G06F 2209/5021; G06F 11/3495
See application file for complete search history.

(56) References Cited

U.S. PATENT DOCUMENTS

| | | | |
|---|---|---|---|
| 8,745,585 B2 | 6/2014 | Watters et al. | |
| 9,864,636 B1 * | 1/2018 | Patel | H04L 47/70 |
| 9,929,969 B1 * | 3/2018 | Krottapalli | H04L 67/10 |
| 9,965,377 B1 * | 5/2018 | Russell | G06F 11/28 |
| 9,983,860 B1 | 5/2018 | Koty et al. | |
| 10,120,670 B1 | 11/2018 | Atkinson et al. | |
| 10,303,586 B1 | 5/2019 | Falko | |
| 10,430,441 B1 * | 10/2019 | Canton | H04W 12/08 |

(Continued)

FOREIGN PATENT DOCUMENTS

CN  108958721 B  10/2020

OTHER PUBLICATIONS

Monitor Jenkins jobs with Datadog Emily Chang and Jordan Obey Retrieved: www.datadoghq.com/blog/monitor-jenkins-datadog/ (Year: 2020).*

(Continued)

*Primary Examiner* — April Y Blair
*Assistant Examiner* — Paul V Mills
(74) *Attorney, Agent, or Firm* — Edell, Shapiro & Finnan, LLC

(57) ABSTRACT

A controller generates a software pipeline in response to obtaining an instruction to build the software pipeline for a first user. The controller divides the software pipeline into a plurality of tasks and determining a set of resources for performing each task in the plurality of tasks. The controller reserves the set of resources based on a policy associated with the first user. The controller causes the first software pipeline to run using the set of resources reserved for performing each task in the plurality of tasks.

23 Claims, 7 Drawing Sheets

(56) References Cited

U.S. PATENT DOCUMENTS

| | | | | |
|---|---|---|---|---|
| 2014/0081972 | A1* | 3/2014 | Eriksson | G06F 8/71 |
| | | | | 707/736 |
| 2014/0289412 | A1* | 9/2014 | Doddavula | G06F 9/5072 |
| | | | | 709/226 |
| 2015/0227959 | A1* | 8/2015 | Qu | G06Q 20/306 |
| | | | | 235/375 |
| 2016/0253172 | A1* | 9/2016 | Shani | G06F 8/70 |
| | | | | 717/101 |
| 2017/0039062 | A1 | 2/2017 | Wood et al. | |
| 2017/0269921 | A1* | 9/2017 | Martin Vicente | G06F 11/3668 |
| 2017/0371636 | A1* | 12/2017 | Palavalli | G06F 9/5077 |
| 2018/0048521 | A1* | 2/2018 | Nair | H04L 41/0896 |
| 2019/0065357 | A1 | 2/2019 | Brafman et al. | |
| 2019/0068690 | A1* | 2/2019 | Canton | H04L 41/0895 |
| 2019/0087214 | A1* | 3/2019 | To | H04L 12/462 |
| 2019/0303119 | A1* | 10/2019 | Atkinson | G06F 9/544 |
| 2019/0317754 | A1 | 10/2019 | Mosquera et al. | |
| 2020/0004660 | A1 | 1/2020 | Falko | |
| 2020/0218623 | A1* | 7/2020 | Zhang | G06F 8/60 |
| 2020/0322442 | A1* | 10/2020 | Luo | H04L 61/302 |
| 2020/0401397 | A1* | 12/2020 | Thomas | G06F 11/0775 |
| 2021/0034413 | A1* | 2/2021 | Ballantyne | G06F 8/71 |
| 2021/0176191 | A1* | 6/2021 | Pargaonkar | G06Q 10/06 |
| 2021/0397588 | A1* | 12/2021 | Keller | H04L 67/303 |
| 2022/0129301 | A1* | 4/2022 | Adeyenuwo | G06F 9/4843 |
| 2022/0237025 | A1* | 7/2022 | Bregman | G06F 9/5088 |

OTHER PUBLICATIONS

Applying Machine Learning to DevOps Andi Mann and Jeff Spencer for GlobalLogic UK&I Retrieved: towardsdatascience.com/applying-machine-learning-to-devops-5fb7d69ac366 (Year: 2017).*

Achieving Continuous Delivery of Immutable Containerized Microservices with Mesos/Marathon Shashi Ravula Aalto University School of Science Master's Thesis (Year: 2017).*

5G Ready Software Defined Test Automation @Rakuten Japan Vijay Raghavendran, Noam Ben Gal Ciscolive! 2019 presentation; DocID: BRKSPM-2018 (Year: 2019).*

Monitor code deployments with Deployment Tracking in Datadog APM Danny Park, Jonathan Epstein www.datadoghq.com/blog/datadog-deployment-tracking/ (Year: 2020).*

Best practices for tagging your infrastructure and applications Mallory Mooney web.archive.org/web/20201101071338/www.datadoghq.com/blog/tagging-best-practices/ (Year: 2019).*

A Review Of Runtime Software Testing Of A Systems Migrate To The Cloud With A Taas Environment Pranali K. Bhowate and Prof. V.B. Gadicha (Year: 2013).*

Improving the scheduling policy for a Continuous Integration Server Viktor Berglund and Isak Eriksson (Year: 2020).*

TLV Python Parser—Version 0.4.0 Fernando Cleber de Souza Readme for "uttlv" project github.com/ustropo/uttlv/blob/ec5633f51eee047c1cdd4902ff0af7873c4f46cd/README.md (Year: 2020).*

A standard method for creating self-defining data structures for information archive and transfer John A. Johnson and Frederic C. Billingsley (Year: 1990).*

Managing Oracle® Solaris 11.1 Network Performance Oracle Corporation Chapter 8 (Year: 2013).*

Parallelize Automated Tests in a Build and Test Environment Selva Ganesh Durairaj Master's Thesis, Linköping University (Year: 2016).*

GoCD, "Getting Started with GoCD Part One", 18 pages, retrieved from Internet Nov. 25, 2020; https://www.gocd.org/getting-started/part-1/.

* cited by examiner

AUTOMATED CONSTRUCTION OF SOFTWARE PIPELINE

TECHNICAL FIELD

The present disclosure relates to software development, especially continuous integration and continuous development pipelines.

BACKGROUND

Continuous Integration (CI) and Continuous Deployment (CD) are two phases in software development that enables separate, incremental additions to a software platform. The CI phase allows multiple developers to merge additions to a shared code base. The CD phase automatically incorporates incremental changes to the production environment of a software platform, enabling rapid changes to propagate to the end user.

A typical CICD pipeline is based on a complex integration of multiple tools from various sources that presents challenges to maintain. Training developers to execute a home-grown CICD process presents additional challenges and uses resources. The engineers/developers of a CICD process typically have a thorough understanding and knowledge of the environment in which they are going to deploy the CICD process, as well as knowledge of the supported CICD tools in the deployment. Implementing a CICD process in a complex environment (e.g., a containerized infrastructure, a cloud-based infrastructure, etc.) presents an additional learning curve to developers tasked with deploying applications in the complex environment.

DESCRIPTION OF EXAMPLE EMBODIMENTS

Overview

Figure 1:
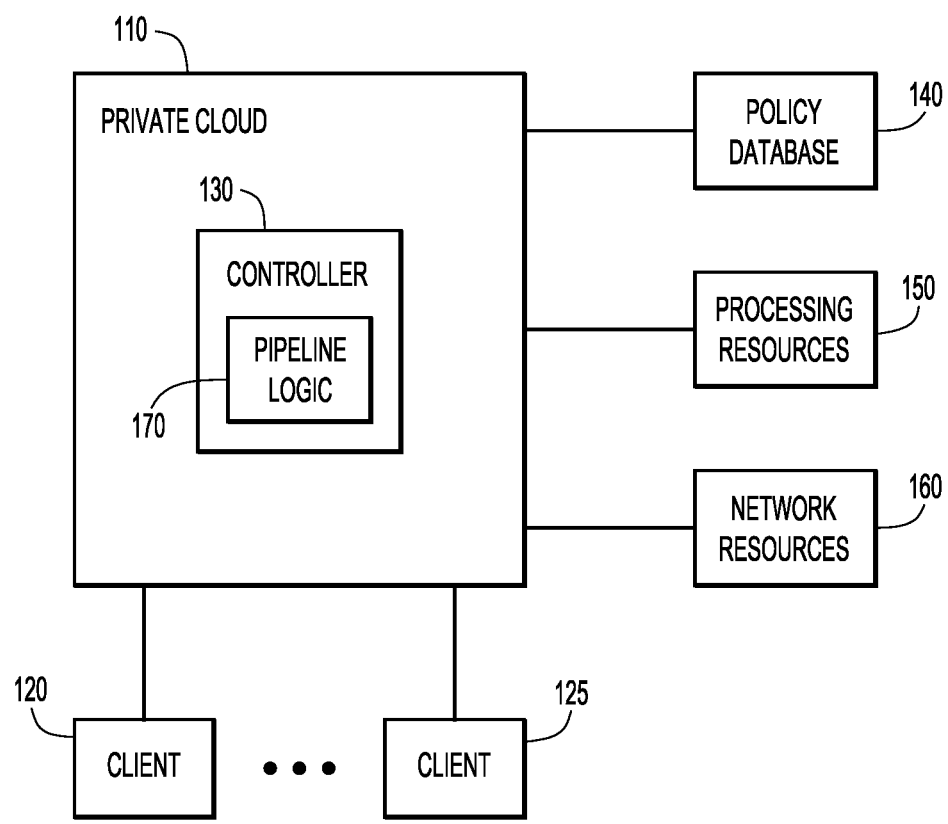
FIG. 1 is a simplified block diagram of a CICD software development system, according to an example embodiment.

A computer implemented method is provided for generating a software pipeline. The method includes obtaining an instruction to build a first software pipeline for a first user and dividing the first software pipeline into a plurality of tasks. The method also includes determining a set of resources for performing each task in the plurality of tasks and reserving the set of resources based on a policy associated with the first user. The method further includes running the first software pipeline using the set of resources reserved for performing each task in the plurality of tasks.

Example Embodiments

One example of integrated testing and deployment in a CICD system uses a CICD server system to monitor and receive a code change, generate a unique change identifier for the received code change, and generate a new code build including the code change. The CICD server system tests the generated new code build by performing a code trace for at least one phase of the testing using an instrumentation library and distributed tracing system of the CICD server system based on at least one predetermined testing parameter that includes a predetermined trace time for the code change of the generated code identifier. The instrumentation library automatically performs the code trace to determine the start and end times of the trace of the code change of the change identifier. A display device coupled to the CICD system displays the test results for the change identifier for that phase of testing to visually highlight a pass or failure of the testing for the code change based on the at least one predetermined testing parameter for the predetermined trace time. This is merely solving an automated CI system for testing based on a code change and updating the results in a dashboard after completion.

Another example of a typical platform to build generic CICD pipelines enables the creation, testing, and/or deployment of generic pipelines, providing the ability to easily switch between CICD tools. Pipelines may be placed in containers that are portable to different CICD tools. The pipelines themselves may include generic scripts that may operate on a variety of different applications. For instance, a pipeline may use the same code to run a security scan on both a Java® application and a Python® application. Containers may be delivered to each CICD tool's environment with scripts enabling the specific code of the environment to work with the generic containerized pipeline. This allows developers to re-use code instead of re-deriving the tool in a given platform, which saves time for the developer.

The techniques presented herein provide for a CICD development tool (e.g., a cloud-based tool) with a messaging system that uses Type-Length-Value (TLV) tags to identify a CI or CD phase of a CICD pipeline, which is especially useful for a Machine Learning (ML) coordinator of the CICD infrastructure. The TLV message system enables the coordinator to bind different modules in the process of building CICD pipelines. The TLV mapping system enables an application to be reserved and deployed to any selected environment or platform. Additionally, the TLV mapping system enables an application to be created, tested and deployed while automatically validating whether it is a CI operation or a CD operation. Additionally, the coordinator may adapt to a different number of stages in a CI or CD process for different use cases using ML.

The system described herein is able to break down the end-to-end CICD process into sub-modules. The system creates and maintains a 2-byte TLV mapping per sub-module. This allows the system to execute multiple tasks that are required parts of a single CICD process independently, enabling a more efficient and faster execution.

As part of any CICD task the system will identify the complete set of tasks involved and break them down them automatically into sub-modules. In each sub-module the system will intelligently process the task list and create 2-byte TLVs and assign them as core TLVs or request-based TLV.

Referring now to FIG. 1, a software development system 100 is shown to enable a private cloud 110 to provide a software development tool for multiple clients (e.g., client 120 and client 125). The private cloud 110 includes a controller 130 in the private cloud 110 that accesses a policy database 140 to coordinate the software development tool for the client 120 and the client 125. The private cloud 110 also has access to processing resources 150 and network resources 160 that may be used for the software development tool or by the software application developed by the software development tool. The controller 130 includes pipeline logic 170 that is configured to enable the controller 130 to perform the techniques described herein.

In one example, the policy database 140 comprises one or more databases that may be local or external to the private cloud 110. The client 120 and the client 125 may be associated with a single policy database 140. Alternatively, the client 120 and the client 125 may be associated with their own single policy database 140, which may be external to the private cloud 110. The policy database 140 includes entries that enable the controller 130 to prioritize tasks in a software pipeline based on the client (e.g., a Service Level Agreement (SLA) for client 120 or client 125) or the function within the software pipeline (e.g., prioritizing preliminary tasks before dependent tasks).

In another example, the processing resources 150 and the network resources 160 may be local or external to the private cloud 110. The processing resources 150 may include a plurality of virtual or physical processors, as well as any associated devices (e.g., memory, co-processors, etc.) used to process data. The network resources 160 may include one or more virtual or physical network elements (e.g., switches, routers, etc.) used to communicate data between devices.

Figure 2:
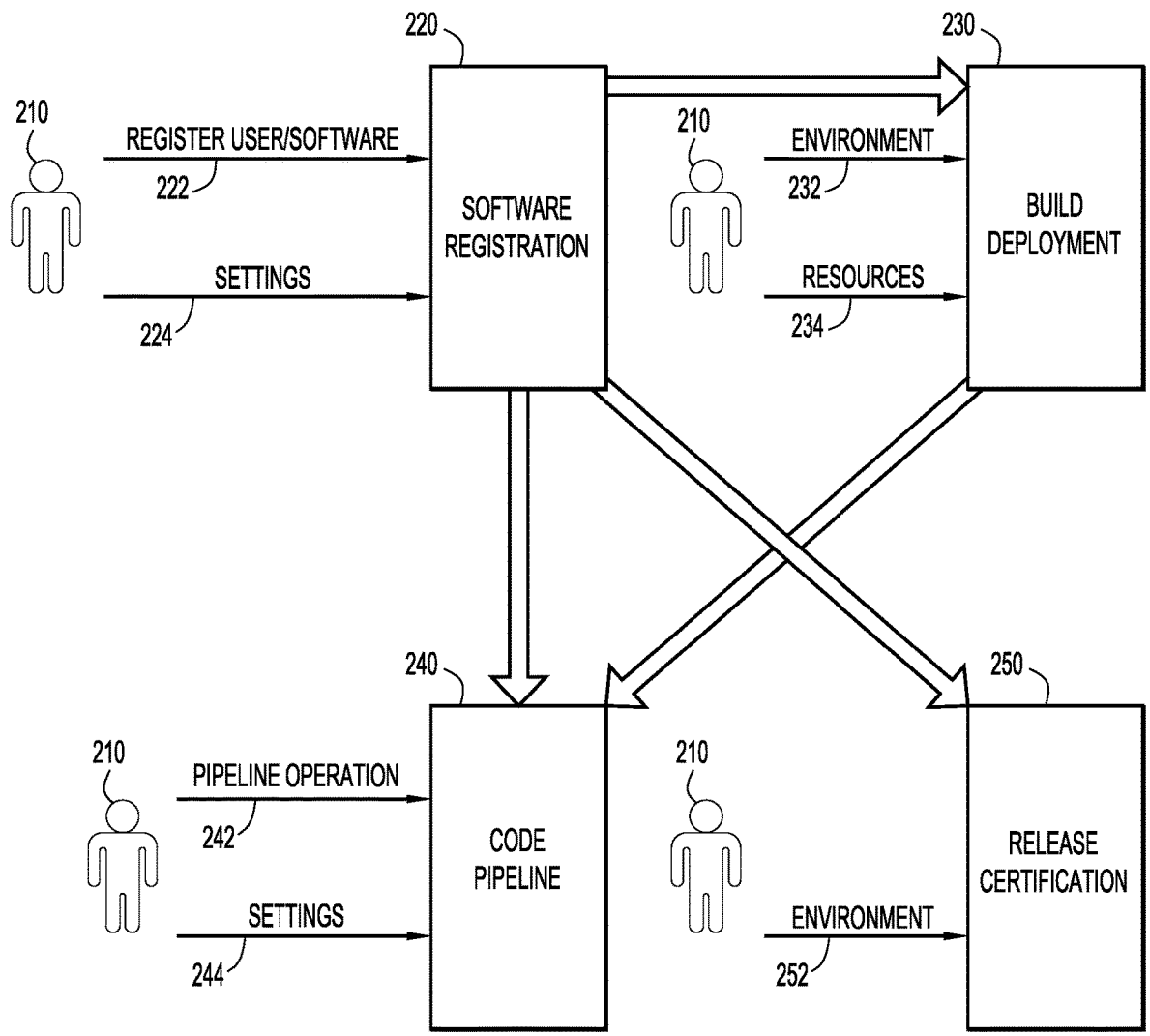
FIG. 2 illustrates components of the user interface for the software development system, according to an example embodiment.

Referring now to FIG. 2, a simplified diagram of a user interface for a user 210 illustrates how the user 210 may interact with the software development tool at different stages. Initially, the user 210 may interact with a software registration module 220 by providing a registration 222. In one example, the registration 222 may identify the user 210 and/or the software to be built by the tool. The user 210 may also provide settings 224 to the software registration module 220. The setting 224 may include an identification of a repository to link the code, a category for the software (e.g., code, software pack, proof of concept, etc.), or an indication of the cloud type (e.g., Resilience Management Platform (RMP), OpenStack, etc.).

In one example, the software registration module 220 provides continuous integration services options for both in-house code development and software packages. For in-house code development, a complete automated, continuous integration service compiles source code, runs tests, and produces software packages that are ready to deploy in various environments (e.g., OpenStack or a containerized cloud infrastructure). The user 210 may provision, manage, and request build servers for the specific code development. The software registration module 220 may scale continuously and process multiple builds concurrently, to avoid any builds being stuck waiting in a queue. For software packages received from vendors, the software registration module 220 provides an entry into an automated continuous integration service, with comprehensive testing that may include deployment in a cloud infrastructure.

User management may provide secure, role-based management access to projects, data, and tools, such as source code management, a code repository, continuous integration tools, or a test manager. The software registration module 220 may also provide the user 210 with the ability to link their own source code management tools, which may be securely accessible through a public network.

The user 210 may also interact with a build development stage 230 by providing an indication 232 of the environment (e.g., development, testing, staging, production, integrated, pre-production, etc.) in which to build the software pipeline. Additionally, the user 210 may provide the build development stage 230 with an indication 234 of a resource selection for the software pipeline.

Additionally, the user 210 may interact with a code pipeline stage 240 by providing an indication 242 of the operation for the software pipeline (e.g., a code commit or a package pull). The user 210 may also provide settings 244 to the code pipeline stage 240 to indicate parameters for the software pipeline to run. The user 210 may also interact with a release certification stage 250 by providing an indication 252 of the type of environment (e.g., stage or pre-production) to produce the certification.

In one example, the user 210 may have access to some or all of the stages depicted in FIG. 2 based on a role of the user 210. The role of the user 210 may also affect the options available to the user 210 at each of the stages in developing the software pipeline.

In another example, the software development tool may automatically download source code or vendor software packages from a repository of the client (e.g., client 120 or client 125). The repository may provide Virtual Machine (VM) packages or containers for automated deployment. The software development tool described herein provides the ability to pull software from a vendor with minimal manual intervention through an automated pipeline that checks the vendor's repository that is accessible from a public network. The ability to automatically pull software enables an extension of the vendor's continuous delivery for approved packages.

Figure 3:
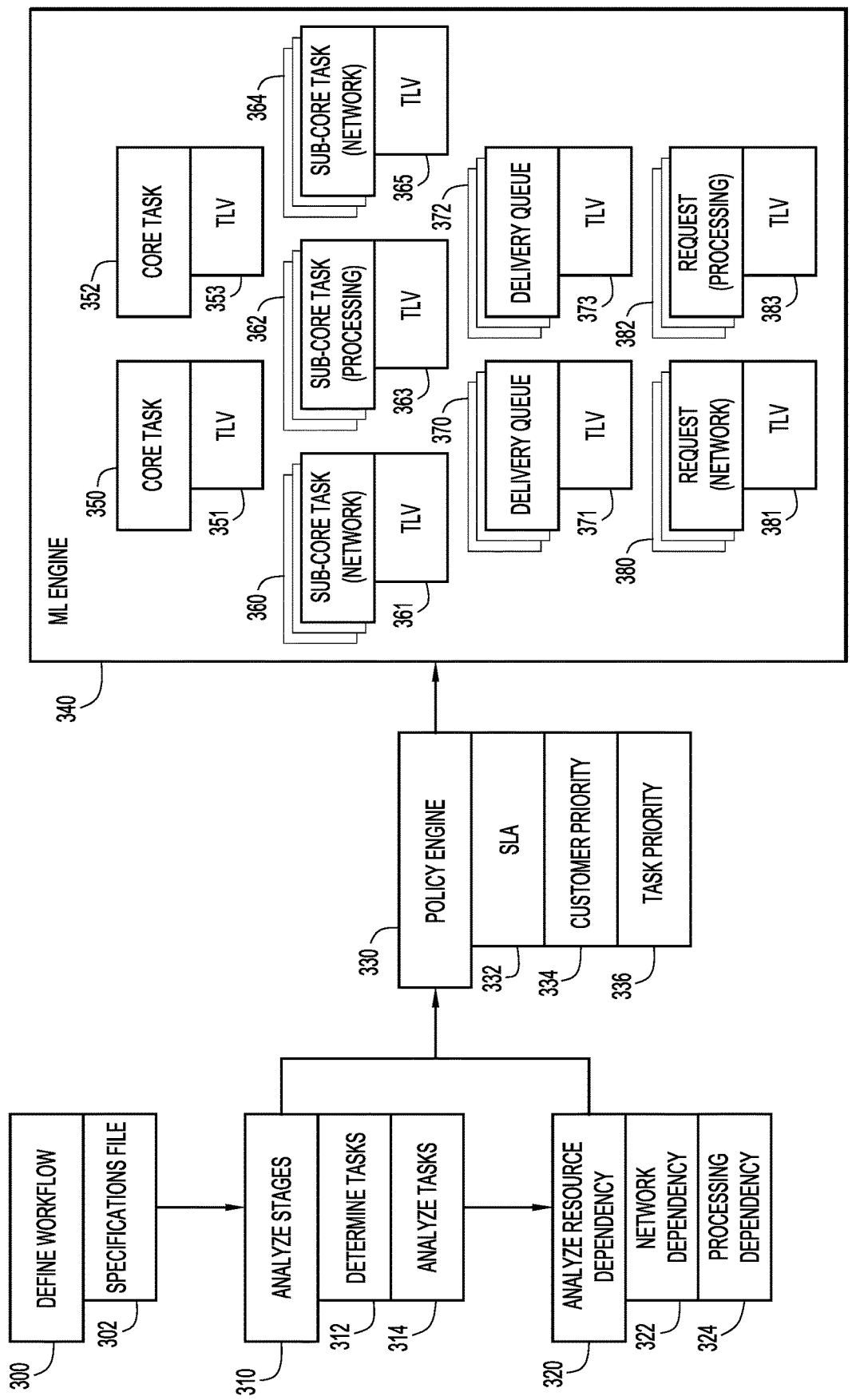
FIG. 3 illustrates the creation of task and associated tags, according to an example embodiment.

Referring now to FIG. 3, a diagram illustrates how the pipeline logic 170 enables the controller 130 to optimize the generation of software pipelines across multiple clients and multiple pipelines. Initially, the user defines the workflow for the pipeline at 300 by uploading a specifications file 302. In one example, the specifications file may be formatted as a Jenkins file or as a Business Process Model and Notation (BPMN) file.

The specifications file 302 is broken down at 310 to analyze the stages in workflow. The controller 130 determines the tasks 312 for each stage of the workflow and analyzes each task at 314. In one example, the controller 130 may use Machine Learning (ML), keyword searching, and/or previous executions to analyze each task. Additionally, the controller 130 may identify tasks as synchronous (e.g., deploy software one the guest operating system is created) or asynchronous (e.g., deployment of multiple instances of the same software).

The controller 130 analyzes the resource dependency for each task at 320. In analyzing the resource dependency, the controller determines network dependencies 322 (e.g., downloading software from an image repository for a deployment) and processing dependencies 324 (e.g., running a script or code for a deployment).

From the analysis of the stages at 310 to determine the tasks 312 and the analysis of the resource dependencies at 320, a policy engine 330 in the controller 130 determines which policies apply to each task of the workflow. Each task may be subject to an SLA policy 332, a customer priority policy 334, and/or a task type priority 336. For instance, an SLA policy 332 may lower the priority of a specific task for a customer that is currently using a large amount of resources in comparison to a contracted SLA. Additionally, a customer may set a specific task with a higher or lower customer priority policy 334 due to the customer's needs. Further, the policy engine 310 may raise the priority of a specific task in the workflow because the task type of the specific task may resolve future dependencies (e.g., a download task type may be generally prioritized over a processing task type if the processing task cannot run before downloading the software).

The controller 130 processes the workflow into a set of tasks and associates a Type-Length-Value (TLV) tag to each task, which enables an ML engine 340 to determine how to accomplish the workflow. In this example, the workflow defined in the specifications file 302 is divided into a core task 350 associated with a TLV tag 351 and a core task 352 associated with a TLV tag 353. In one example, core tasks may be associated with a specific customer or overall project. Each core task creates one or more sub-core tasks, such as network sub-core task 360 associated with TLV tag 361, processing sub-core task 362 associated with TLV tag 363, and network sub-core task 364 associated with TLV tag 365. In one example, a sub-core task may be associated with testing or deploying a software package.

Each sub-core task creates one or more request tasks for one or more delivery queues, such as delivery queue 370 associated with TLV tag 371 and delivery queue 372 associated with TLV tag 373. In one example, the TLV tag 371 and 373 enable the ML engine 340 to determine the processing priority of the task. Depending on the availability of processing resources and/or network resources, the ML engine 340 may shuffle the delivery queue 370 or 372 based on the number/priority of the tasks in the delivery queue and the SLA policy associated with each customer/task, optimizing resource utilization across all customers.

The delivery queues 370 and 372 include one or more request tasks, such as request task 380 associated with TLV tag 381 and request task 382 associated with TLV tag 383. Request task 380 may be network based (e.g., pull a specific software package from a particular repository), and request task 382 may be processing based (e.g., run a specific software package in a particular environment). The TLV tag 381 for a network based request task 380 may indicate Enhanced Transmission Selection (ETS) or Priority Flow Control (PFC). The TLV tag 383 for the processing based request task 382 may indicate an adjustment to processing resources (e.g., processing core or processing cycles).

In one example, the controller 130 of the software development tool is responsible for identifying all of the core tasks in a workflow. Core tasks are individual tasks that should be executed. A core task may be an individual process or dependent task.

The controller 130 may create one or many core TLVs for each core task involved with part of the workflow. The value in the core TLV may be a sub-core-TLV (if they are inter-linked tasks) or execute a request-based TLV. The core-TLVs may be executed in parallel unless one core-TLV has a dependent core-TLV. The controller 130 tracks completion of each core-TLV and may display an overall completion status for the entire workflow.

In another example, request-based TLVs may be created to manage or trigger a specific request, like sending a request payload, triggering a specific task, or triggering a subsequent process. Each core-TLV may be responsible for creating any required request-based TLVs.

There are multiple advantages with using a TLV based system for CICD purposes. TLVs may be used to map the CICD projects to a system level queuing system and provide different Quality of Service (QoS) levels for accomplishing different tasks.

Different users that leverage a CICD process may expect different SLA levels, which typical systems do not supply. The development tool presented herein may map the TLV bits to IP/Ethernet level QoS bits and provide differentiated service level offerings. The TLV bits may also be used to provide different level of processing (e.g., Central Processing Unit (CPU)) cycles, which is not available in typical CICD pipeline tools.

In one example, the development tool may use a ML engine 340 for the complete set of tasks for one or more tenants (E.g., client 120 or client 125). For instance, the tool may integrate with an external tenant and policy management system provided by a customer or external cloud entity. The tool may retrieve policy information for a tenant from the external system to determine the service level offering for the tenant. Depending on the priority of the tenant, the ML engine 340 intelligently manages the policies for the tenant in the system and creates relevant TLV bits for the CICD functions for that tenant.

Additionally, the tool may maintain predefined set of CICD functions and their stage details, with options to create and define new CICD processes. The ML engine 340 may identify tasks involved in each stage of a CICD function and, depending on the level of service offering associated with the tenant, the ML engine 340 may assign different levels of SLA for the tasks.

Depending on the internal SLA definition for each task the ML engine 340 may identify the core task(s) in that stage, intelligently identify whether tasks may be executed sequentially or in parallel, and create the core TLVs and the request-based TLVs appropriate to each task.

A core TLV for a task may create a sub-core TLV, which creates a delivery queue sub-core TLV as its value. The delivery-queue sub-core TLV has a request-based TLV as its value. The request-based TLV is coded with a thread priority parameter, to define CPU core and CPU cycles allocated to that task or process.

A core TLV for a task may create at least one sub-core TLV, with each sub-core TLV having a delivery queue TLV as its value. The delivery queue TLV with a value for the delivery queue sub-core TLV being a request-based TLV. The request-based TLV bits may be coded with Enhanced Transmission Selection (ETS) or Priority Flow Control (PFC) parameters. Depending on the SLA for the tenant the coordinator/ML engine in the system may assign either of the request-based TLVs or both for a priority customer and availability of underlying resources in the infrastructure.

Depending on the SLA definition, ETS values are assigned based on finding the least cost routes or finding the highest priority routes. PFC parameters enable separation of the traffic from other IP traffic enabling faster execution and delivery of packets.

Depending on the TLVs created, the system intelligently assigns appropriate underlying hardware resources from worker nodes or network devices from the resource pool.

Depending on the underlying resource availability and SLA definition for the tenant, the controller 130 in the tool may also create one or more sub-core-TLVs identified as a delivery queue TLV. Each sub-core TLV will have its value as a delivery queue sub-core TLV. The delivery queue will have a request-based TLV parameter as its value. The controller 130 may assign the delivery queue parameter values depending on the number of parallel task executions from other tenants. A delivery queue parameter defines the priority for the tenant. The tenant with the highest priority queue will be delivered first.

TLVs are queued intelligently for optimal usage of the hardware and software. The controller 130 tracks each TLV of each tenant and may modify the order and sequence of any execution or create more TLVs, depending on performance of the underlying platform.

Depending on the SLA definition, the controller 130 in the system maintains the TLV details for each successful task along with details of the underlying platform resources used for that execution. This information may be stored per tenant.

For a new CI or CD operation from a tenant, the controller 130 again identifies the tasks involved in each stage of operation. For each task per stage, the controller 130 analyzes the previous execution history and TLV details, and determines whether to use same TLVs and underlying platform or assign different TLVs for the current task.

This development tool improves the tracking of each corresponding task with a corresponding TLV tag, and greatly reduces task execution time in comparison to conventional CICD systems.

In a further example, executing the software development tool described herein creates TLVs based on the service policy definition for each user or priority of each job and the associated tasks. The tool may create network TLVs (e.g., ETS or PFC) to allow faster execution and delivery of packets, enabling faster download or deployment of Virtual Network Functions (VNFs).

The tool may also create network thread priority TLVs for different number of CPUs and/or CPU cycles, enabling faster execution of any CICD job (e.g., testing, associated automation, etc.).

A delivery queue parameter TLV may process multiple executions on the same hardware resource, but prioritizes tasks for a priority customer or based on importance of delivery. The tool may constantly adjust priority based on any new requests submitted and tenant policy for each submitted workflow.

On completion of a successful task, the controller 130 may perform a performance benchmarking of the set of tasks performed and analyze how to improve each task. The controller 130 may perform this by analyzing a plurality of similar tasks from different tenants and identify which was the most optimized job performing that task.

Resource contention, parallel execution, and optimizing resource utilization is a major factor when it comes to delivery of a solution for developing a CICD pipeline. Typically, a simple task may be delayed for hours due to inefficient resource use. The software development tool described herein targets that problem of inefficient resource allocation.

Figure 4:
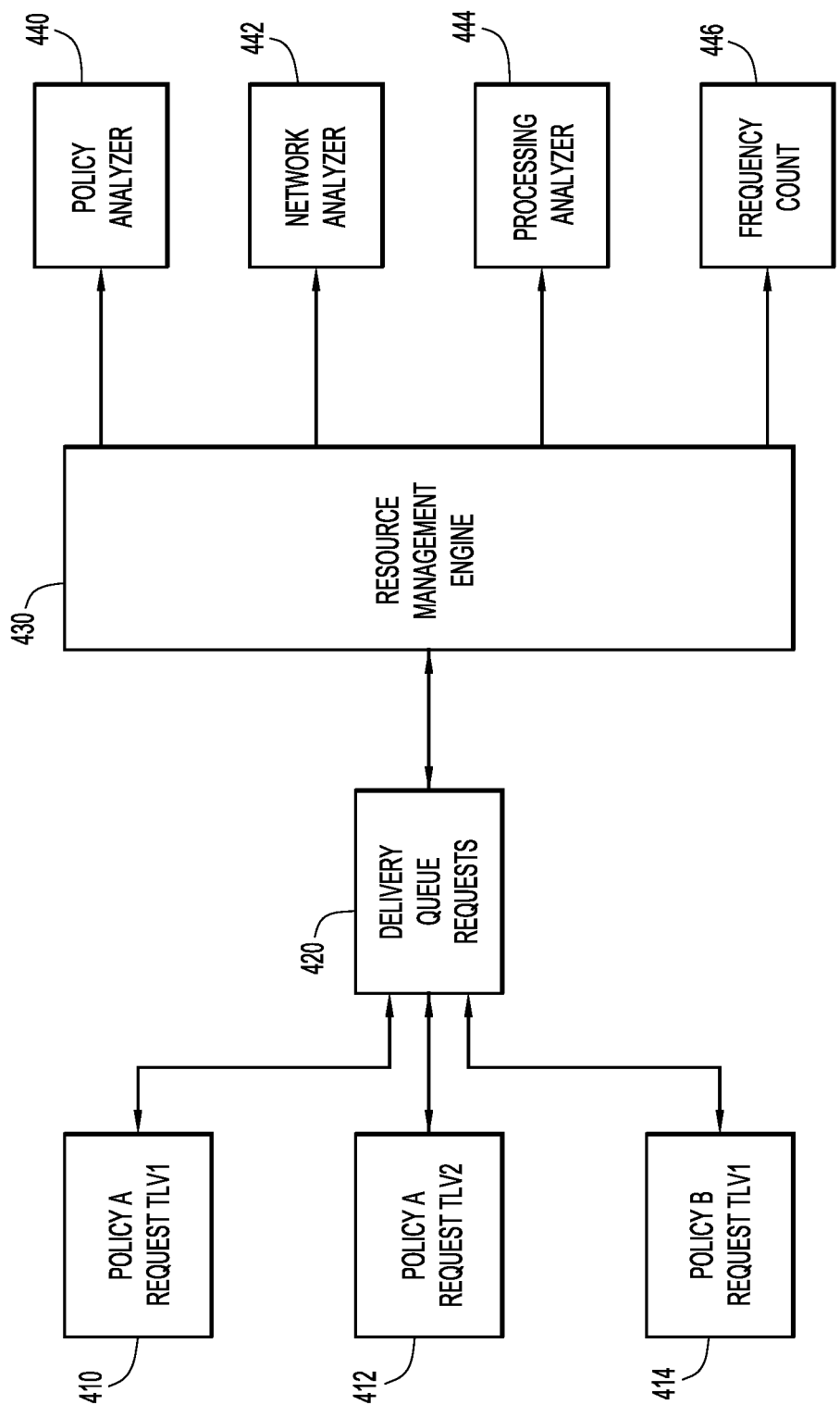
FIG. 4 illustrates the resource management components of the software development system, according to an example embodiment.

Referring now to FIG. 4, an example is shown of the development tool prioritizing and allocating resources to different tasks and/or tenants. In this example, tasks 410, 412, and 414 are added to a delivery queue 420. Task 410 is associated with a first TLV tag (e.g., TLV1) and a first policy (e.g., policy A) for a first tenant (e.g., client 120). Task 412 is associated with a second TLV tag (e.g., TLV2) and the first policy (e.g., policy A). Task 412 is associated with the first TLV (e.g., TLV1) and a second policy (e.g., policy B) for a second tenant (e.g., client 125).

The resource management engine 430 determines the order to process each task in the delivery queue 420 by consulting a policy analyzer 440, a network analyzer 442, a processing analyzer 444, and a frequency count 446. The resource management engine 430 monitors the resources available to the development tool and allocates the resources (e.g., processing cores/cycles, memory, network connectivity, etc.) to each task. The resource management engine 430 may use ML logic to optimize the task queues and use of resources. Additionally, the resource management engine 430 may analyze the delivery queue to process task requests (e.g., tasks 410, 412, or 414) with a higher priority.

Figure 5:
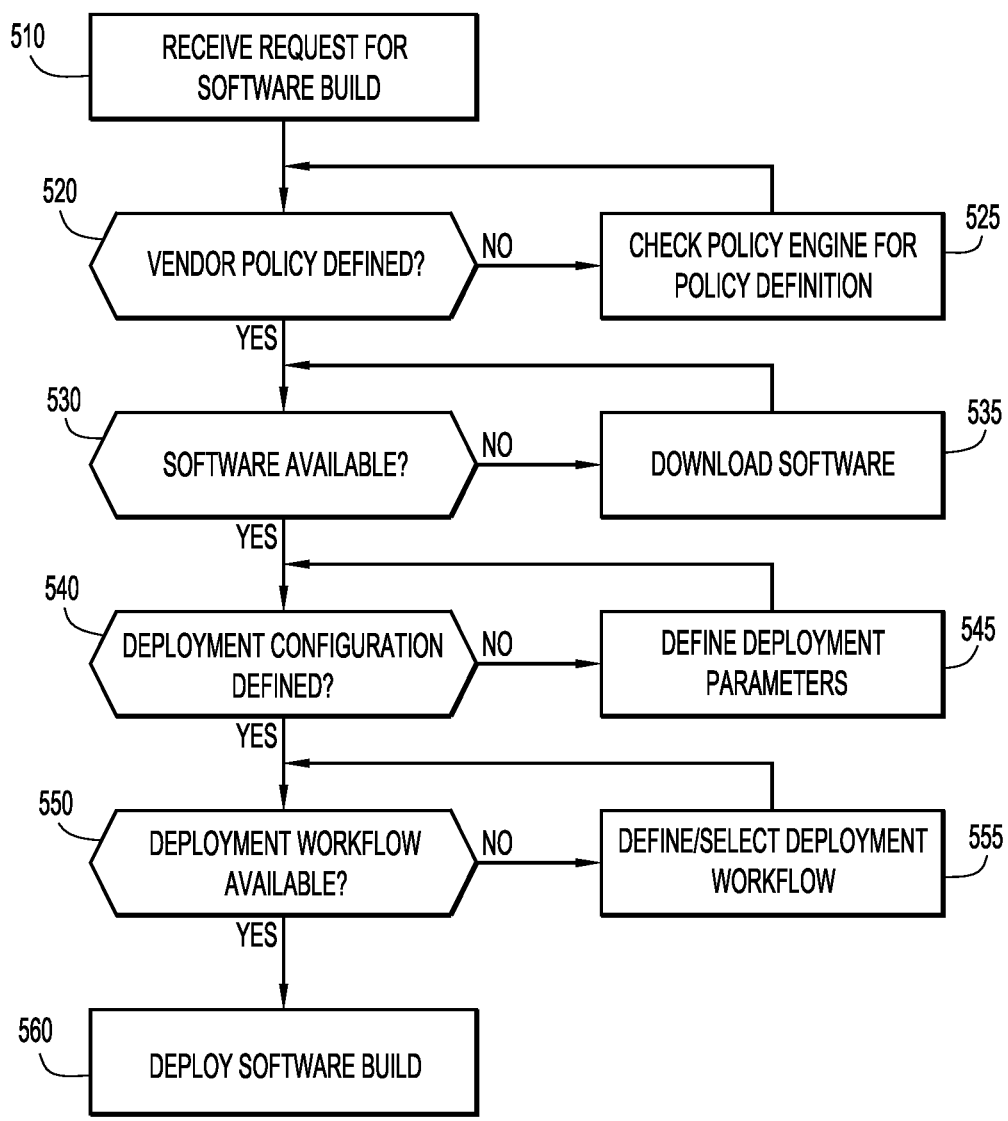
FIG. 5 is a flowchart illustrating operations performed at a private cloud to build and deploy software, according to an example embodiment.

Referring now to FIG. 5, a flowchart illustrates operations performed by a controller (e.g., controller 130) of a software development tool in a process 500 to build and deploy a software package. At 510, the controller receives a request for a software build. In one example, the request includes a workflow specification (e.g., a Jenkins file or BPMN file) that describes the software build. At 520, the controller determines whether a vendor policy for the software build has been defined. If the controller does not have a vendor policy for this software build, the controller checks a policy engine for the vendor policy definition at 525. In one example, the policy engine may retrieve the vendor policy from an external policy database associated with the vendor.

At 530, the controller determines whether the software is available to be run on the resources available to the controller. In one example, the software may not be available to run until after the code is downloaded from a code repository. If the controller does not have the software available to run, then the controller downloads the software package at 535. In one example, the controller may download the software package from a repository specified in the request for the software build.

At 540, the controller determines whether the initial deployment configuration has been defined for the software build. If the deployment configuration has not been defined, then the controller determines and defines the deployment parameters at 545. In one example, the controller may determine the parameters for the deployment configuration based on a combination of information in the request for the software build and a policy that is applicable to the requester of the software build.

At 550, the controller determines whether the deployment workflow is available. If the deployment workflow is not available, then the controller defines and/or selects the deployment workflow at 555. Once the vendor policy has been defined, the software has been downloaded, the deployment configuration has been defined, and the deployment workflow is available, then the controller may complete the process by deploying the software build at 560.

Figure 6:
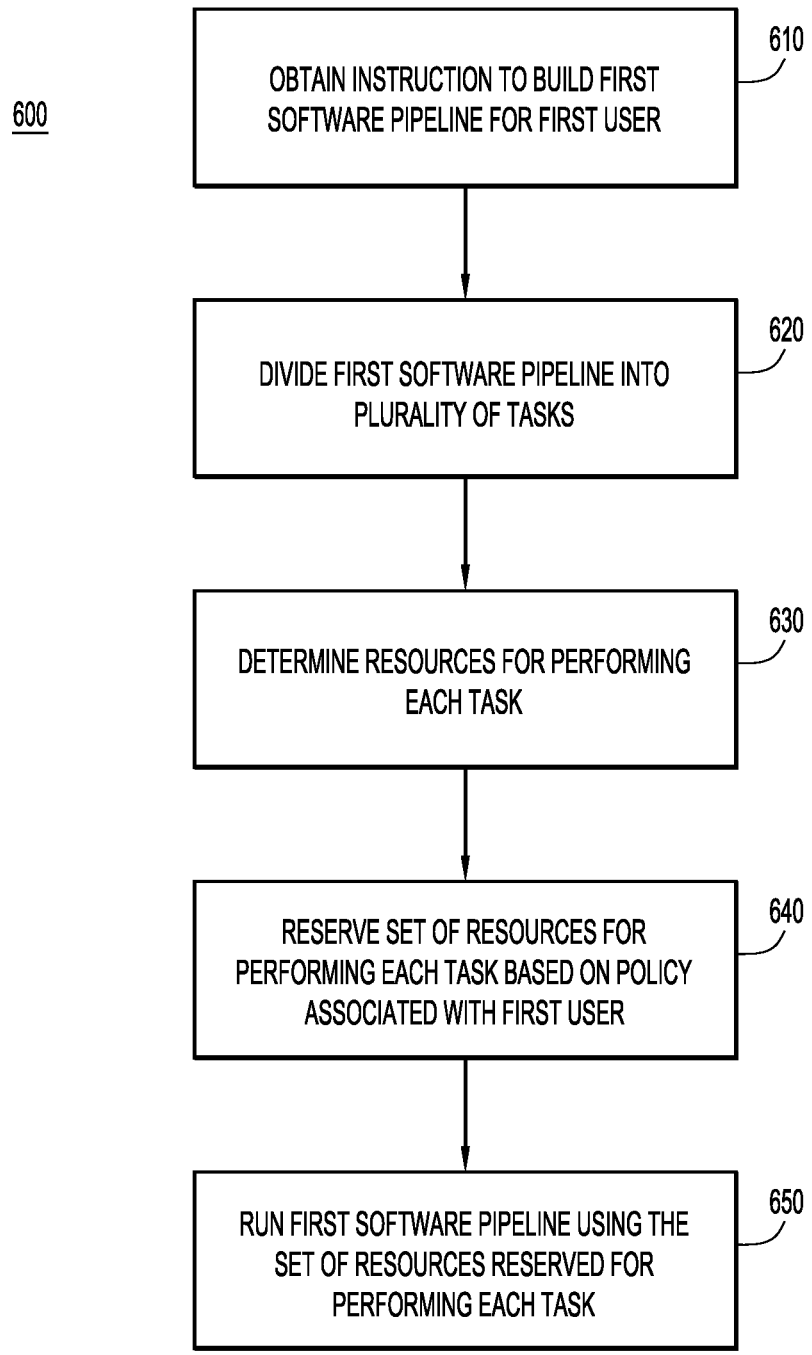
FIG. 6 is a flowchart illustrating operations performed at the controller of a private cloud network to create and manage software development pipelines, according to an example embodiment.

Referring now to FIG. 6, a flowchart illustrates operations performed by a controller of a software development tool in a process 600 for running a software pipeline. At 610, the controller obtains an instruction to build a first software pipeline for a first user. In one example, the instruction may identify a repository from which to download the code for the first software pipeline. At 620, the controller divides the first software pipeline into a plurality of tasks. In one example, the plurality of tasks may include core tasks, sub-core tasks, and request-based tasks.

At 630, the controller determines the resources for performing each task. In one example, the resources may include network resources and/or processing resources. At 640, the controller reserves a set of resources for performing each task based on a policy associated with the first user. In one example, the controller may also reserve the set of resources for performing each task based on additional information, such as performance information for previous iterations of each task, or the priority of each task. At 650, the controller causes the first software pipeline to run using the set of resources reserved for the first software pipeline.

Figure 7:
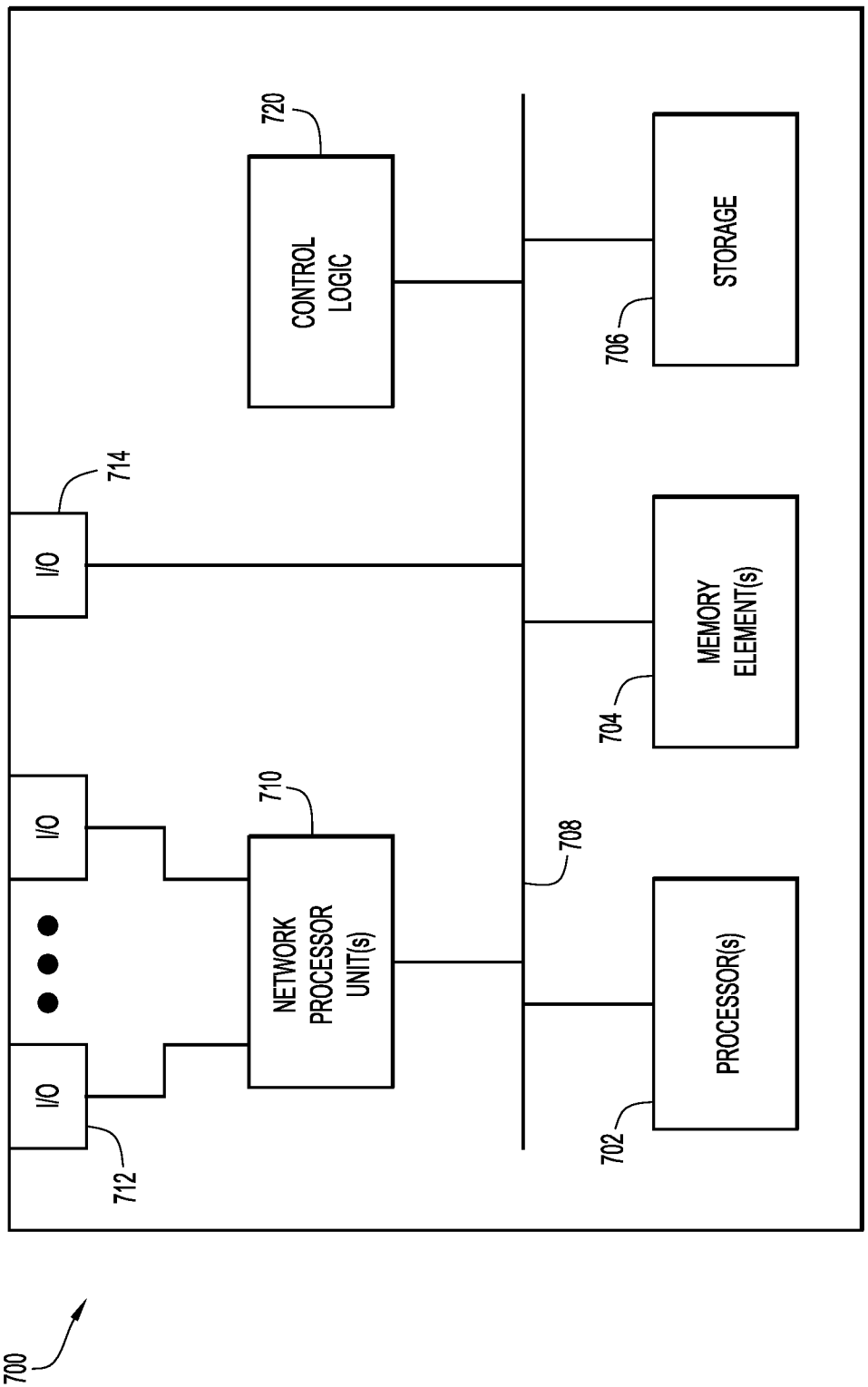
FIG. 7 illustrates a simplified block diagram of a device that may be configured to perform the methods presented herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein build a development/staging environment in a containerized infrastructure, which enables drag and drop capability for building a complex CICD process. The techniques presented herein enable measuring the resource availability in the containerized infrastructure, independent of usage, which provides the ability to maximize the usage of containerized infrastructure for a rapidly changing development environment. These techniques may be used for carrier-class Cloud-native Network Function (CNF) CICD testing and validation with stringent SLA requirements.

The system described herein significantly reduces capital expenditure costs by reusing infrastructure assets in a dynamic environment. The system provides accurate usage of resource by using the application consumption data, and intelligently automates a complex end-to-end process in a heavily containerized environment.

The deployment of an application using a CICD pipeline may include multiple stages of installation. The stages may include specific tasks to install at least one library or program. Each CI and CD pipeline definition is typically re-configured for the underlying tool and platform used. The system presented herein enables the use of a generic CI or CD process, which may be created for a single process or enhanced to support multiple stages. The system helps achieve complete abstraction from any underlying toolsets.

The system presented herein provides a coordinator that may use ML-based TLV mapping which bind the end-to-end CICD Process. The system also manages resources with an over-subscription factor tracking for infrastructure capacity as part of the TLV calculation. Unlike typical container clusters, the system presented herein provides application resource limits which are tracked through a reservation system.

The system presented herein may leverage a Continuous Deployment and Automation Framework (CDAF) to implement the CICD process. The CDAF process may define the flow for the system presented herein. The flow for the system may be built on any framework, allowing the system to be easily customized.

In one form, a computer-implemented method is provided for generating a software pipeline. The method includes obtaining an instruction to build a first software pipeline for a first user and dividing the first software pipeline into a plurality of tasks. The method also includes determining a set of resources for performing each task in the plurality of tasks and reserving the set of resources based on a policy associated with the first user. The method further includes running the first software pipeline using the set of resources reserved for performing each task in the plurality of tasks.

In another form, an apparatus comprising a network interface and a processor is provided. The network interface is configured to communicate with a plurality of computing devices. The processor is coupled to the network interface, and configured to obtain an instruction via the network interface. The instruction indicates a first software pipeline to build for a first user. The processor is also configured to divide the first software pipeline into a plurality of tasks and determine a set of resources for performing each task. The processor is further configured to reserve the set of resources for performing each task based on a policy associated with the first user. The processor is also configured to cause the first software pipeline to run using the set of resources reserved for performing each task in the plurality of tasks.

In still another form, a non-transitory computer readable storage media is provided that is encoded with instructions that, when executed by a processor, cause the processor to obtain an instruction to build a first software pipeline for a first user and divide the first software pipeline into a plurality of tasks. The instructions also cause the processor to determine a set of resources for performing each task and reserve the set of resources for performing each task based on a policy associated with the first user. The instructions further cause the processor to run the first software pipeline using the set of resources reserved for performing each task in the plurality of tasks.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:
1. A computer-implemented method comprising:
obtaining an instruction to build a first software pipeline for a first user associated with a first tenant;
dividing the first software pipeline into a plurality of tasks, wherein the plurality of tasks includes a plurality of request tasks;
retrieving policy information for the first tenant;
determining a set of resources for performing each task in the plurality of tasks based on a service level offering defined in the policy information for the first tenant;

associating each of the plurality of tasks with a corresponding tag, wherein each of the plurality of request tasks is associated with a corresponding Type-Length-Value (TLV) tag having a plurality of bits representing Enhanced Transmission Selection (ETS) parameters or Priority Flow Control (PFC) parameters;

placing the plurality of request tasks into one or more delivery queues;

shuffling the one or more delivery queues based on a priority level associated with each of the plurality of request tasks and a policy associated with the first user;

allocating the set of resources for performing each task based on the policy associated with the first user;

running the first software pipeline using the set of resources allocated for performing each task in the plurality of tasks;

automatically tracking a performance of each task in the plurality of tasks with the corresponding tag; and analyzing previous execution history and the corresponding tag for each task in the plurality of tasks to determine whether to assign a different tag to each task.

2. The method of claim 1, wherein at least one task in the plurality of tasks is shared across a plurality of software pipelines.

3. The method of claim 1, wherein each corresponding tag identifies a corresponding task across a plurality of software pipelines.

4. The method of claim 1, wherein automatically tracking the performance of each task in the plurality of tasks further comprises:
processing the performance of each task in the plurality of tasks across a plurality of software pipelines using machine learning.

5. The method of claim 1, further comprising adjusting the set of resources allocated for performing one or more tasks in the plurality of tasks based on a relative priority of the first software pipeline to a second software pipeline, wherein the second software pipeline is built for a second user associated with a second tenant different than the first tenant.

6. The method of claim 1, wherein the set of resources for performing each task comprises network resources or processing resources.

7. The method of claim 1, wherein the first software pipeline includes a Continuous Integration (CI) operation or a Continuous Deployment (CD) operation.

8. The method of claim 1, wherein the TLV tag further includes one or more bits representing one or more of:
a plurality of Quality of Service (QOS) levels,
a plurality of processing levels,
one or more functions of a Continuous Integration (CI) operation,
one or more functions of a Continuous Deployment (CD) operation, or
a thread priority parameter identifying one or more central processing unit (CPU) cores and one or more CPU cycles allocated to each task in the plurality of tasks.

9. An apparatus comprising:
a network interface configured to communicate with a plurality of computing devices; and
a processor coupled to the network interface, the processor configured to:
obtain an instruction via the network interface, the instruction indicating a first software pipeline to build for a first user associated with a first tenant;
divide the first software pipeline into a plurality of tasks, wherein the plurality of tasks includes a plurality of request tasks;
retrieve policy information for the first tenant via the network interface;
determine a set of resources for performing each task in the plurality of tasks based on a service level offering defined in the policy information for the first tenant;
associate each of the plurality of tasks with a corresponding tag, wherein each of the plurality of request tasks is associated with a corresponding Type-Length-Value TLV) tag having a plurality of bits representing Enhanced Transmission Selection (ETS) parameters or Priority Flow Control (PFC) parameters;
place the plurality of request tasks into one or more delivery queues;
shuffle the one or more delivery queues based on a priority level associated with each of the plurality of request tasks and a policy associated with the first user;
allocate the set of resources for performing each task based on the policy associated with the first user;
cause the first software pipeline to run using the set of resources allocated for performing each task in the plurality of tasks;
automatically track a performance of each task in the plurality of tasks with the corresponding tag; and
analyze previous execution history and the corresponding tag for each task in the plurality of tasks to determine whether to assign a different tag to each task.

10. The apparatus of claim 9, wherein at least one task in the plurality of tasks is shared across a plurality of software pipelines.

11. The apparatus of claim 9, wherein each corresponding tag identifies a corresponding task across a plurality of software pipelines.

12. The apparatus of claim 9, wherein the processor is configured to automatically track the performance of each task in the plurality of tasks by:
processing the performance of each task in the plurality of tasks across a plurality of software pipelines using machine learning.

13. The apparatus of claim 9, wherein the processor is further configured to adjust the set of resources allocated for performing one or more tasks in the plurality of tasks based on a relative priority of the first software pipeline to a second software pipeline, wherein the processor is configured to build the second software pipeline for a second user associated with a second tenant different than the first tenant.

14. The apparatus of claim 9, wherein the processor is configured to allocate the set of resources for performing each task by allocating network resources or processing resources.

15. The apparatus of claim 9, wherein the first software pipeline includes a Continuous Integration (CI) operation or a Continuous Deployment (CD) operation.

16. The apparatus of claim 9, wherein the TLV tag further includes one or more bits representing one or more of:
a plurality of Quality of Service (QOS) levels,
a plurality of processing levels,
one or more functions of a Continuous Integration (CI) operation,
one or more functions of a Continuous Deployment (CD) operation, or
a thread priority parameter identifying one or more central processing unit (CPU) cores and one or more CPU cycles allocated to each task in the plurality of tasks.

17. One or more non-transitory computer readable storage media encoded with software comprising computer executable instructions and, when the software is executed, it is operable to cause a processor to:
- obtain an instruction to build a first software pipeline for a first user associated with a first tenant;
- divide the first software pipeline into a plurality of tasks, wherein the plurality of tasks includes a plurality of request tasks;
- retrieve policy information for the first tenant;
- determine a set of resources for performing each task in the plurality of tasks based on a service level offering defined in the policy information for the first tenant;
- associate each of the plurality of tasks with a corresponding tag, wherein each of the plurality of request tasks is associated with a corresponding Type-Length-Value (TLV) tag having a plurality of bits representing Enhanced Transmission Selection (ETS) parameters or Priority Flow Control (PFC) parameters;
- place the plurality of request tasks into one or more delivery queues;
- shuffle the one or more delivery queues based on a priority level associated with each of the plurality of request tasks and a policy associated with the first user;
- allocate the set of resources for performing each task based on the policy associated with the first user;
- run the first software pipeline using the set of resources allocated for performing each task in the plurality of tasks;
- automatically track a performance of each task in the plurality of tasks with a corresponding tag; and
- analyze previous execution history and the corresponding tag for each task in the plurality of tasks to determine whether to assign a different tag to each task.

18. The one or more non-transitory computer readable storage media of claim 17, wherein at least one task in the plurality of tasks is shared across a plurality of software pipelines.

19. The one or more non-transitory computer readable storage media of claim 17, wherein each corresponding tag identifies a corresponding task across a plurality of software pipelines.

20. The one or more non-transitory computer readable storage media of claim 17, wherein the software is further operable to cause the processor to automatically track the performance of each task in the plurality of tasks by:
- processing the performance of each task in the plurality of tasks across a plurality of software pipelines using machine learning.

21. The one or more non-transitory computer readable storage media of claim 17, wherein the software is further operable to cause the processor to adjust the set of resources allocated for performing one or more tasks in the plurality of tasks based on a relative priority of the first software pipeline to a second software pipeline, wherein the second software pipeline is built for a second user associated with a second tenant different than the first tenant.

22. The one or more non-transitory computer readable storage media of claim 17, wherein the software is further operable to cause the processor to allocate the set of resources for performing each task by allocating network resources or processing resources.

23. The one or more non-transitory computer readable storage media of claim 17, wherein the first software pipeline includes a Continuous Integration (CI) operation or a Continuous Deployment (CD) operation.

* * * * *

UNITED STATES PATENT AND TRADEMARK OFFICE
CERTIFICATE OF CORRECTION

PATENT NO. : 12,333,331 B2
APPLICATION NO. : 17/176524
DATED : June 17, 2025
INVENTOR(S) : Vijayakumar Raghavendran et al.

Page 1 of 1

It is certified that error appears in the above-identified patent and that said Letters Patent is hereby corrected as shown below:

In the Claims

Claim 9, Column 16, Lines 8-9, please replace "corresponding Type- Length-Value TLV)" with --corresponding Type- Length-Value (TLV)--

Signed and Sealed this
Twenty-second Day of July, 2025

Coke Morgan Stewart
*Acting Director of the United States Patent and Trademark Office*